United States Patent [19]

Court et al.

[11] Patent Number: 4,750,295
[45] Date of Patent: Jun. 14, 1988

[54] GATE OPENING AND CLOSING APPARATUS

[76] Inventors: Edward R. Court, 32909 N. Canyon Quail Trail Rd., Aqua Dulce, Calif. 91350; Jorge A. Nunez, 10673½ Laurel Canyon, Pacoima, Calif. 91331

[21] Appl. No.: 70,205

[22] Filed: Jul. 6, 1987

[51] Int. Cl.[4] .............................................. E05F 15/10
[52] U.S. Cl. ......................................... 49/340; 49/357
[58] Field of Search .................... 49/340; 49/339, 344, 49/357, 25

[56] References Cited

U.S. PATENT DOCUMENTS

| 4,638,597 | 1/1987 | Lybecker | 49/340 |
| 4,658,543 | 4/1987 | Carr | 49/340 |

*Primary Examiner*—Peter A. Aschenbrenner
*Assistant Examiner*—Gerald A. Anderson
*Attorney, Agent, or Firm*—Jack C. Munro

[57] ABSTRACT

An apparatus for the opening and closing of a gate which uses an electrically operated motor to open and close the gate. The motor is operated by a plurality of batteries electrically mounted in series. The batteries are to be charged by a solar charging device. When charging, the batteries are connected electrically in parallel.

2 Claims, 1 Drawing Sheet

GATE OPENING AND CLOSING APPARATUS

BACKGROUND OF THE INVENTION

The field of this invention relates to devices for automatically opening and closing of a gate.

The use of gates in conjunction with fences has long been known. A common location of use is within rural areas such as on a farm or a ranch. It is most common that when a need arises to open the gate, generally the person requiring that the gate be opened is located within some type of vehicle such as a truck or a piece of farm equipment. The common procedure is for the individual to stop the vehicle and remove himself from the vehicle in order to open the gate. Then the individual must get back into the vehicle and move the vehicle a few feet through the gate. Then the individual must again disembark from the vehicle and relatch the gate and then the individual gets back into the vehicle and continues on his or her way.

It is common for a rancher or farmer to be required to open and close several gates each and every day. As a result, a substantial amount of time can be lost in the opening and closing of gates. This time could certainly be better utilized in conjunction with the individual's normal work of farming and ranching.

Within recent years, the farmer or rancher has been able to purchase an automatic gate opening apparatus. This gate opening apparatus can be operated by a manual switch located some spaced distance from the gate, or can be operated by either an emitted sound wave or radio wave. Switching systems can be by a push button operated switch, a card, a key or a digital entry system which requires the entry of a certain numerical combination.

Previously, the automatic operating of such a gate has been through the use of electrical power. Electrical power requires a source of electrical energy. Because such gates are commonly located in locations far from electrically conducting cables, some other type of source of electrical energy is required other than conventional line electrical current.

A common type of electrical source would be one or more batteries. With the automatic gate openers of the prior art, it has been common that only after a few openings and closings of the gate, the batteries need to be recharged. To avoid this recharging procedure, it has been common to install in connection with the batteries a solar powered recharging device whose function is to recharge the batteries during the time that the gate is not being used. However, within the prior art, even after one hundred fifty to two hundred openings and closings of a solar charged gate, the batteries will still require a separate recharging procedure.

There is a need to construct a gate which uses a minimal amount of energy during the opening and closing of a gate so that a substantial increased number of gate openings and closings is achieved through the use of the batteries mounted in conjunction with the gate and also so that the solar charging device is able to recharge the batteries without the use of further additional separate chargings.

SUMMARY OF THE INVENTION

The apparatus of the present invention utilizes an arm which is connected to a gate. The arm connects to a motor. Electrically operating of the motor includes the arm which in turn moves the gate from a closed position to an open position and vice versa. A pair of batteries are mounted in conjunction with the motor. These batteries operate through a switching device, in series, when operating the motor. Also connected with the batteries is a solar powered charging device. The solar powered charging device automatically supplies electrical energy to the batteries when the gate is in its closed position. The solar powered charging device operates in an electrically parallel relationship with respect to the batteries.

One of the advantages of the present invention is to utilize the gate opening and closing apparatus which does not require the running of any electrical cable to the apparatus.

Another objective of the present invention is to construct a gate opening and closing apparatus wherein a fully charged apparatus will open and close a gate over two thousand times with no charging energy being supplied to the batteries.

Another objective of the present invention is that with solar charging energy being supplied to the batteries, the gate can be operated over one hundred fifty time per day with no loss of energy within the batteries and without the batteries ever requiring a separate recharging procedure.

Another objective of the present invention is to construct a solar powered gate opening and closing apparatus which is non-complex in construction and can be manufactured at less cost than the prior art apparatuses.

DETAILED DESCRIPTION OF THE SHOWN EMBODIMENT

Figure 1:
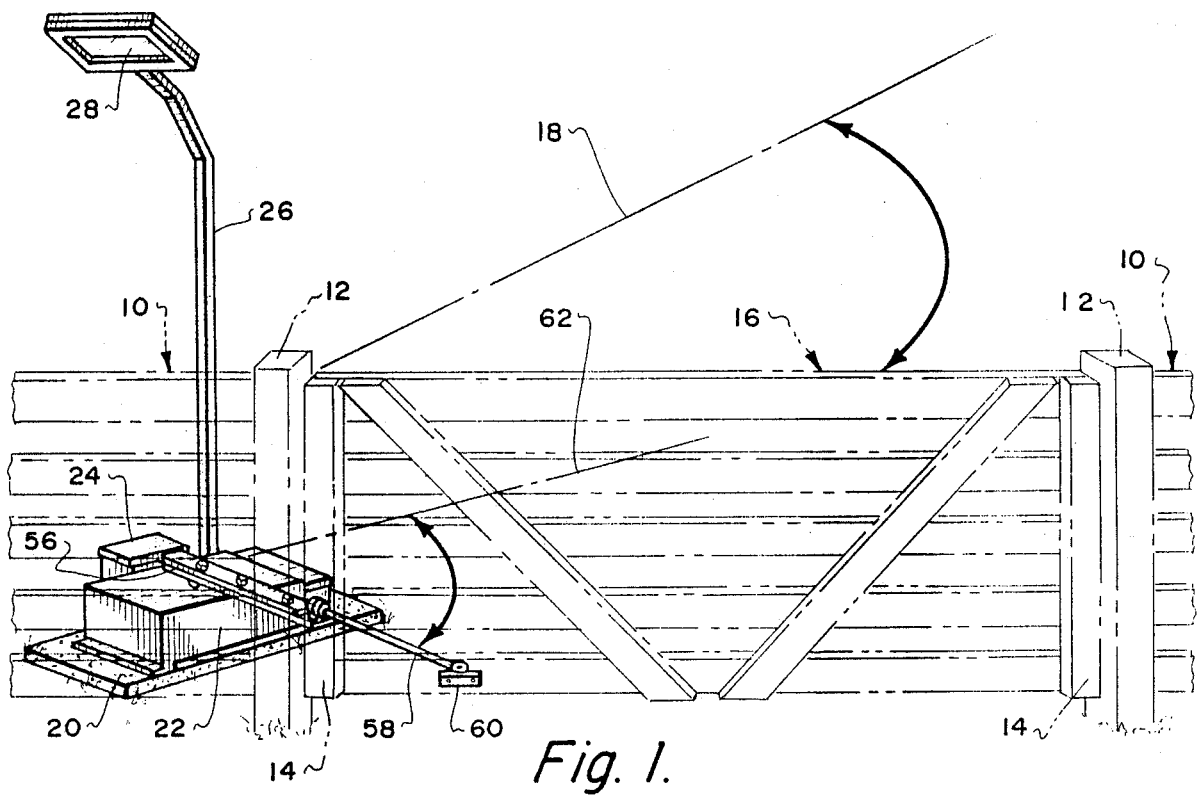
FIG. 1 is a diagrammatic view of the gate opening and closing apparatus showing such being mounted in conjunction with a conventional gate.

Referring particular to the drawing, there is shown a conventional fence 10 which is composed of a plurality of spaced apart fence posts 12 which are mounted within the ground. Located between directly adjacent fence posts 12 are a plurality of vertically spaced apart rails 14. To provide for ease of movement through the fence 10, there is included a gate 16. This gate 16 is shown in FIG. 1 as being located in the closed position and is capable of being moved to an open position represented by line 18. It is to be understood that the construction of the fence 10 and the gate 16 may be either of wood, metal or any other rigid material.

Mounted in conjunction with the fence 10 in a fixed position is a cement base 20. Mounted on the base 20 is a housing 22. Also mounted on the base 20 located directly adjacent the housing 22 is a battery housing 24. Connected with the housing 22 is a pole 26. The outer end of the pole 26 connects to a solar panel housing 28. The solar panel 28 includes an array of solar cells 34. The function of the solar cells 34 is to receive energy from the sun and transform such into electrical energy which is conducted by wires (not shown) through the pole 26 to batteries 30 and 32 which are mounted within the battery housing 24.

Located within the housing 22 is an electrically operated motor 36. This motor 36 has a rotationally driven output shaft 38. Also mounted within the housing 22 is a switching assembly which includes a manually operated switch 40 and a motor operated switch 42. The motor operated switch 42 is to be movable to the closed position by means of a connection to the shaft 38. Upon the shaft 38 having rotated a prescribed number of revolutions or operated for a prescribed period of time, the switch 42 will then move from its closed position (connecting electrical conductors 44 and 46) to an open position which is shown in solid lines of FIG. 2 of the drawing.

Activation of switch 40 is to cause motor 36 to be operated. Operation of motor 36 will then cause switch 42 to move to the closed position. Switch 42 will remain in this closed position even after release of the switch 40 thereby insuring that the motor 36 will be operated for the pre-established period of time. It is to be understood that the switch 40 can actually comprise a manually operated push button switch or can comprise a card key or a sonic or radio controlled activation device.

Activation of switch 40 causes relay coil 48 to be activated. Activation of relay coil 48 results in switches 50, 52 and 54 to be moved from the solid line position shown in FIG. 2 to the dotted line position shown in FIG. 2. When in the dotted line position, the batteries 30 and 32 are located electrically in series with the motor 36. Therefore, if the batteries 30 and 32 are twelve volt batteries, there are actually twenty-four volts being utilized to operate the motor 36 supplying maximum power to operate the motor 36.

Figure 2:
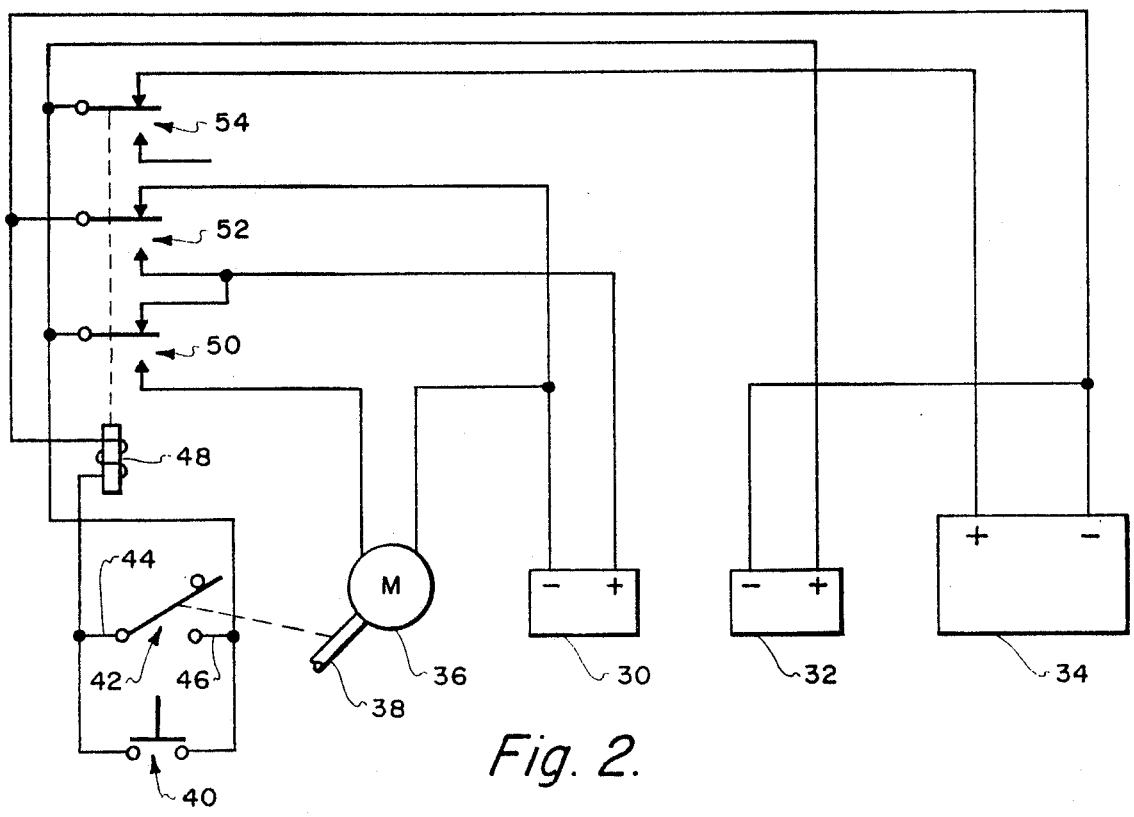
FIG. 2 is a an electrical schematic diagram of the gate opening and closing apparatus of this invention.

After the motor has operated for the prescribed period of time and the switch 42 moves to the solid line position shown in FIG. 2, the coil 48 is deactivated causing switches 50, 52 and 54 to again move to the solid line shown positions of FIG. 2. In this particular position, the solar cell array 34 is now located electrically in parallel with batteries 30 and 32. Let it be assumed that the array 34 has an output of one and one-half amps of power. It is possible that one and one-half amps over an extended period of time could cause damage to a battery. In the past, within the prior art, in order to avoid such damage, it was necessary to put in the circuitry a regulator. However, within the present invention, the use of a regulator is not necessary because instead of one and one-half amps of power being supplied to the batteries, the batteries 30 and 32 are located in parallel with the array 34. This means that only three-quarters of an amp of power is being supplied to each battery 32. At this low level of current, damage to any of the batteries 30 and 32 is not possible.

The motor shaft 38 connects to an arm 56. The outer end of the arm 56 is attached to a rod 58. The rod 58 is adjustable on arm 56. The outer end of rod 58 is connected to a bracket 60. Bracket 60 is mounted on the gate 16. Therefore, rotation of the motor shaft 38 results in angular displacing of the arm 56 from the solid line position shown in FIG. 1 to the position depicted by line 62. This displacing of arm 56 will move the gate 16 from the closed position to the open position and vice versa. Therefore, it is to be understood that the shaft 38 is to be rotatable in both directions which means that the motor 36 has to be a reversible motor. Appropriate conventional electrical mechanism is to be included within the circuitry shown in FIG. 2 in order to provide for reversing of the motor 36 upon the gate 16 reaching its open position represented by line 18. Also, the electrical circuitry will include a delay which will have the gate 16 remain in the open position for a prescribed period of time before closing.

What is claimed is:

1. A gate opening and closing apparatus comprising:
    an electrically operated motor;
    an arm, said arm being movable between a first position and a second position, said arm being moved by said motor, said arm being connected to said gate for opening and closing;
    a pair of batteries, said batteries to supply energy to said motor, said batteries being electrically connected in series when operating said motor thereby additively utilizing the voltage of both batteries;
    a solar powered charging device, said solar powered charging device being connected to said batteries, said solar powered charging device being electrically connected in parallel with said batteries when charging said batteries thereby evenly dividing the amperage of said solar powered charging device between said batteries; and
    switching means, said switching means being operable to operate both said motor and the connection of said solar powered charging device to said batteries, said switching means being movable between an at-rest position and a motor operating position, said charging device being connected to said batteries when said switching means is in said at-rest position, and disconnected when said switching means in said motor operating position.

2. The gate opening and closing apparatus as defined in claim 1 wherein:
    upon said motor being initially activated said motor will continue to operate until a predetermined limit of operation is reached which coincides to complete opening of the gate.

* * * * *